(12) United States Patent
Hampson et al.

(10) Patent No.: US 11,802,223 B2
(45) Date of Patent: *Oct. 31, 2023

(54) BINDER COMPOSITIONS AND USES THEREOF

(71) Applicant: KNAUF INSULATION SPRL, Vise (BE)

(72) Inventors: Carl Hampson, St. Helens (GB); Ferdous Khan, St. Helens (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/860,743

(22) Filed: Jul. 8, 2022

(65) Prior Publication Data

US 2023/0002648 A1 Jan. 5, 2023

Related U.S. Application Data

(62) Division of application No. 15/771,779, filed as application No. PCT/EP2016/075823 on Oct. 26, 2016, now Pat. No. 11,384,264.

(30) Foreign Application Priority Data

Oct. 30, 2015 (GB) .................................... 1519187

(51) Int. Cl.
| | |
|---|---|
| *C09J 103/04* | (2006.01) |
| *C08B 31/00* | (2006.01) |
| *B27N 3/00* | (2006.01) |
| *D04H 1/587* | (2012.01) |
| *C08L 3/04* | (2006.01) |
| *D04H 1/00* | (2006.01) |
| *D04H 1/58* | (2012.01) |
| *C08J 5/24* | (2006.01) |
| *D04H 1/4209* | (2012.01) |

(52) U.S. Cl.
CPC .............. *C09J 103/04* (2013.01); *B27N 3/00* (2013.01); *B27N 3/002* (2013.01); *C08B 31/003* (2013.01); *C08J 5/249* (2021.05); *C08L 3/04* (2013.01); *D04H 1/00* (2013.01); *D04H 1/4209* (2013.01); *D04H 1/58* (2013.01); *D04H 1/587* (2013.01); *C08J 2303/04* (2013.01)

(58) Field of Classification Search
CPC ...... C09J 103/04; C09J 103/00; C09J 105/00; C09J 101/00; C09J 101/02; C09J 101/08; C09J 11/04; C08L 3/00; C08L 1/00; C08L 5/00
USPC ......................................................... 428/323
See application file for complete search history.

(56) References Cited

U.S. PATENT DOCUMENTS

| | | |
|---|---|---|
| 6,855,753 B1 | 2/2005 | Englert |
| 2003/0059636 A1 | 3/2003 | Nigam |
| 2010/0294725 A1 | 11/2010 | Bush et al. |
| 2013/0263520 A1 | 10/2013 | Houga et al. |
| 2014/0094560 A1* | 4/2014 | Crescimanno ........... C08K 3/20 524/561 |
| 2014/0134909 A1 | 5/2014 | Guo et al. |
| 2015/0299391 A1 | 10/2015 | Pacorel |

FOREIGN PATENT DOCUMENTS

WO 2016009062 1/2016

OTHER PUBLICATIONS

Espy, H. H.: "The mechanism of wet-strength development in paper: a review", Tappi journal, technical association of the pulp & paper industry. Atlanta, US, vol. 78, n) 4, Apr. 1, 1995, pp. 90-99, XP001182746, ISSN: 0734-1415, the whole document.
Office Action for co-pending U.S. Appl. No. 15/771,779 (10 pages)—dated Mar. 4, 2020.
Office Action for co-pending U.S. Appl. No. 15/771,779 (13 pages)—dated Oct. 9, 2020.
Office Action for co-pending U.S. Appl. No. 15/771,779 (11 pages)—dated May 27, 2021.

* cited by examiner

*Primary Examiner* — Jane L Stanley
(74) *Attorney, Agent, or Firm* — Knauf Insulation, Inc.; James K. Blodgett (57) ABSTRACT

The present disclosure provides for aqueous, curable binder compositions, as well as articles and products comprising assemblies of matter comprising mineral fibers, synthetic fibers, natural fibers, cellulosic particles and sheet materials comprising the binder compositions disclosed herein.

14 Claims, 3 Drawing Sheets

BINDER COMPOSITIONS AND USES THEREOF

CROSS-REFERENCE TO RELATED APPLICATIONS

This application is a divisional of U.S. application Ser. No. 15/771,779, filed Apr. 27, 2018, which is a U.S. national counterpart application of International Application Serial No. PCT/EP2016/075823, filed Oct. 26, 2016, under 35 U.S.C. § 371, which claims priority to GB Application Serial No. 1519187.7, filed Oct. 30, 2015, the disclosures of which are hereby incorporated herein by reference.

SUMMARY OF THE INVENTION

The present disclosure provides for improved binder compositions, including curable binder compositions for use in manufacturing products from a collection of non-assembled or loosely assembled matter. For example, these binder compositions may be employed to product fiber products which may be made from woven and non-woven fibers. In some embodiments, the binder compositions disclosed herein are used to bind glass fibers to produce fiberglass. In further embodiments, the disclosed binder compositions are used to bind mineral wool fibers, such as glass wool or stone wool, to form a matted layer for the production of an insulating product. In still further embodiments, the binder compositions disclosed herein are used to produce wood fiber boards, particle boards and oriented strand boards (OSBs) characterized by improved physical properties (e.g., enhanced mechanical strength). Further, the binders may be used to assemble sheets of cellulosic material, such as sheets of wood, to manufacture plywood. Additionally, processes for binding loosely assembled matter and producing articles from loosely assembled matter bound using the binder compositions are provided.

Formaldehyde-free binder compositions have previously been reported, including curable, formaldehyde-free binder compositions comprising one or more of sustainable materials, polyacids, anhydrides, polyhydroxyl components, polyamines, carbohydrates, derivatives thereof, and additional components such as silicon comprising compounds. However, formaldehyde-free binders and resins may be characterized by a disadvantageous coloration, e.g. upon curing, which may not be commercially desirable. In addition, previously disclosed formaldehyde-free binders may lack sufficient bond strength while disadvantageously increasing binder production costs.

In some embodiments, the present disclosure provides for an assembly of matter comprising one or more of mineral fibers, synthetic fibers, natural fibers, cellulosic particle materials, and sheet materials, characterized by improved properties including but not limited to the reduction or elimination of undesirable coloration and improved mechanical properties.

In further embodiments, a process for the preparation of an assembly of matter as described herein is provided.

In still further embodiments, a cost-effective process for the commercial production of the disclosed formaldehyde-free binder compositions, which are alternatively referred to herein as "binders" and "binder compositions," is provided.

In additional embodiments, an improved, formaldehyde-free binder composition produced using renewable and/or sustainable feedstocks and components is provided.

In certain embodiments, formaldehyde-free binder compositions capable of rapidly curing and providing sufficient commercial strength are provided.

In some embodiments, commercial products and articles comprising the disclosed formaldehyde-free binders are disclosed.

In certain embodiments, the commercial articles and products of the present disclosure may comprise an assembly of matter comprising one or more of mineral fibers, synthetic fibers, natural fibers, cellulosic particle materials and sheet materials bonded together by a binder composition disclosed herein, including an aqueous curable binder composition comprising a monosaccharide or polysaccharide and an azetidinium crosslinker. In additional embodiments, a binder composition as disclosed herein may comprise one or more reaction products resulting from one or more crosslinking reactions between a monosaccharide and/or a polysaccharide and an azetidinium crosslinker.

DETAILED DESCRIPTION OF THE INVENTION

In some embodiments, a monosaccharide for use in the disclosed technology may comprise a 5-carbon monosaccharide or a 6-carbon monosaccharide such as dextrose. In further embodiments, a polysaccharide of the present disclosure may comprise at least two saccharide units, including at least four saccharide units and up to $10^6$ saccharide units, such as up to 3000 saccharide units, 5000 saccharide units and 10000 saccharide units, such as native starch and starch derivatives. Starch generally comprises two different polymers of D-glucopyranose, amylose and amylopectin. Amylose is a linear polysaccharide, while amylopectin is a highly branched polysaccharide. Amylose has a relatively low molecular weight with a degree of polymerization ranging from 1000 to 10000 glucose units and a molecular weight (MW) of greater than $10^6$ g/mol, while amylopectin is a larger branched polysaccharide with a degree of polymerization of greater than $10^5$ and a molecular weight (MW) of greater than $10^7$ g/mol. In additional embodiments, starch derivatives for use in the disclosed technology may comprise one or more of starch ethers such as carboxymethyl starches, hydroxyalkyl starches, cationic starches, amphoteric starches, starch esters such as starch acetates, starch phosphates, starch octenyl succinate, acid modified starch, oxide modified starch, and partially hydrolysed starches such as dextrins. In certain embodiments, polysaccharides for use in the present disclosure may be derived from cellulose and other natural or synthetic sources, including chitin. Starch derivatives such as dextrins and maltodextrins comprise D-glucose units linked in chains of variable lengths, for instance from 2 to 20 glucose units.

In some embodiments, azetidinium crosslinkers may be utilized. As would be known to those of skill in relevant arts, multifunctional azetidinium crosslinker may be prepared using different coupling agents and amine functional monomers with different ratios, including the use of at least one substituted or unsubstituted, four-membered nitrogen comprising heterocycle. In further embodiments, an azetidinium group may be chemically bonded to a homopolymer or a copolymer chain comprising one or more nonazetidinium monomer units incorporated into the polymer structure. In still further embodiments, an azetidinium crosslinker for use in the instant disclosure may comprise at least two azetidinium groups. An azetidinium polymer for use in the present disclosure may comprise the general structure below:

wherein 1) n is an integer greater than or equal to 1, 2) $R_1$ comprises an $C_1$-$C_{25}$ alkanediyl group, such as a $C_1$-$C_{10}$ alkanediyl group or a $C_1$-$C_5$ alkanediyl group that may be optionally substituted with a hydroxyl group, a carboxyl group or an amine group, 3) $R_2$ may be independently R1 or —$R_3$—NH—C(O)—$R_4$—, with $R_3$ and $R_4$ independently comprising a $C_1$-$C_{25}$ alkanediyl group, such as a $C_1$-$C_{10}$ alkanediyl group or a $C_1$-$C_5$ alkanediyl group, 4) $Y_1$ and $Y_3$ comprise a hydrogen (H) group or a $C_1$-$C_5$ alkyl group that may be optionally substituted with a hydroxyl group, an amine or a carboxyl group, 5) Y2 comprises a hydroxyl (OH—) group or a chemical group as defined by Y1, and 6) $X^-$ comprises a halogen ion.

As would be appreciated by those of skill in the relevant arts, azetidinium functionalized polymers comprise highly reactive quaternary ammonium groups, which in certain embodiments may improve embodiments and properties of products and articles comprising the binders disclosed herein, including but not limited to antimicrobial activity. While in no way limiting the scope of the present disclosure, it is believed that the reactivity of azetidinium functional groups may be due to in part to angle strain, which may beneficially increase its reactivity with nucleophiles. In additional embodiments, azetidinium crosslinkers for use in the instant disclosure may polymerize at elevated temperatures and/or by radical initiation.

In some embodiments, the dry weight ratio of monosaccharide and/or polysaccharide to azetidinium crosslinker comprises a range of 99:1 to 60:40, such as a range of 98:2 to 70:30 and a range of 95:5 to 75:25.

In additional embodiments, the aqueous binder compositions disclosed herein exhibit unexpectedly high bond strength upon curing. The loss of bond strength after weathering may be significantly reduced as compared to prior art thermoset binders.

The bond strength of a veil product bonded with invention binder compositions may be slightly affected by the pH of the composition, notably at lower relative azetidinium content. More particularly, alkaline pH of the binder composition has a tendency to slightly reduce the bond strength (dry and wet) while acidic pH pushes the bond strength up, at higher starch/azetidinium ratios.

In some embodiments, an aqueous binder composition as disclosed herein comprises one or more mono- and/or polysaccharide(s) crosslinked by an azetidinium crosslinker and further comprises a crosslinker capable of undergoing free radical polymerization selected from the group consisting of polycarboxylic acids, acrylamides, methacrylamides, acrylates, acrylic acids, acrylonitrile, bisphenol acrylics, carbohydrate monomers, fluorinated acrylics, maleimide, polyfunctional acrylics, salts thereof and mixtures thereof. In certain embodiments where free radical polymerization is initiated by a free radical initiator, the aqueous binder composition may further comprise one or more free radical initiator(s) for the initiation of an increased number of crosslinking reactions between the saccharide residues and the crosslinker. Such crosslinking reactions may be initiated by introducing a sufficient amount of energy, including heat and/or radiation, into the aqueous binder composition to generate a highly crosslinked resin which confers improved bond strength upon curing to an assembly of matter, composition or article in accordance with the present disclosure. In accordance with the present disclosure, a two-stage polymerization process comprising a second step of free radical polymerization provides a highly polymerized resin characterized by an advantageously increased polymerization density in articles and materials comprising fibers, cellulosic particulates and/or sheet materials.

In some embodiments, the binder compositions disclosed herein may advantageously reduce the energy cost and/or production time associated with bonding and subsequently curing of articles and products comprising fibers and cellulosic particulate or sheet materials.

In certain embodiments, a polycarboxylic acid for use in the disclosed technology may be selected from monomeric and polymeric polycarboxylic acids, unsaturated aliphatic dicarboxylic acids, saturated aliphatic dicarboxylic acids, aromatic dicarboxylic acids, unsaturated cyclic dicarboxylic acids and saturated cyclic dicarboxylic acids, any of which may be optionally substituted with hydroxy, halo, amino, alkyl, carboxy, alkoxy, and anhydride groups, as well as salts, esters and mixtures thereof. In further embodiments, one or more polycarboxylic acids for use in the disclosed binder compositions is selected from the group consisting of malic acid, glutamic acid, glutaconic acid, 3-fumarylpyruvic acid, 2,5-furandicarboxylic acid, mesaconic acid, mesoxalic acid, glutaric acid, nedocromil, 4-(gamma-glutamylamino) butanoic acid, neoglutyl, succinic acid, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to produce an alcohol capable of being further oxidized to a carboxylic acid, maleic acid, malic acid, mesaconic acid, biphenol A or bisphenol F reacted via the Kolbe-Schmitt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, salts and anhydrides thereof, and combinations thereof. In further embodiments, a polymeric polycarboxylic acid for use in the disclosed binders is selected from polyacrylic acid, polymethacrylic acid, polymaleic acid, copolymers thereof, anhydrides thereof, and mixtures thereof. Examples of commercially available polyacrylic acids include AQUASET™ 529 (Rohm & Haas, Philadelphia, Pa., USA), CRITERION 2000 (Kemira, Helsinki, Finland, Europe), NF1 (H. B. Fuller, St. Paul, Minn., USA), and Sokalan® (BASF, Ludwigshafen, Germany), which is a water-soluble polyacrylic copolymer of acrylic acid and maleic acid having a molecular weight of approximately 4000. AQUASET™ 529 is a composition containing polyacrylic acid cross-linked with glycerol and sodium hypophosphite as a catalyst. CRITERION 2000 is an acidic solution of a partial salt of polyacrylic acid, having a molecular weight of approximately 2000. NF1 is a copolymer containing carboxylic acid and hydroxy groups, as well as chain transfer agents such as sodium hypophosphite or organophosphate catalysts. The polymeric polycarboxylic acid may be a homopolymer or copolymer prepared from unsaturated carboxylic acids including, but not limited to, acrylic acid, methacrylic acid, crotonic acid, isocrotonic acid, maleic acid, cinnamic acid, 2-methylmaleic acid, itaconic acid, 2-methylitaconic acid and α,β-methyleneglutaric acid. Alternatively, the polymeric polycarboxylic acid may be prepared from unsaturated anhydrides including, but not limited to, maleic anhydride, itaconic anhydride, acrylic anhydride, methacrylic anhydride and mixtures thereof. Methods for polymerizing these acids and anhydrides are well known in the chemical arts. In some embodiments, a polymeric polycarboxylic acid for use in the disclosed technology may additionally comprise a copolymer of one or more of the unsaturated carboxylic acids or anhydrides and one or more vinyl compounds disclosed herein including styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether and vinyl acetate. The molecular weight of the polymeric polycarboxylic acids and polyacrylic acid polymers may be less than 10000 Daltons (Da), less than 5000 Da, or about 3000 Da or less, including 2000 Da.

In some embodiments, acrylamide and methacrylamide monomers for use in the disclosed binder compositions may be selected from the group consisting of alkylacrylamide, N-tert-butylacrylamide, diacetone acrylamide, N,N-diethylacrylamide, N,N-diethylmethacrylamide, N,N-dimethylacrylamide, N-[3-(dimethylamino)propyl]methacrylamide, N-diphenylmethylacrylamide, Nethylacrylamide, N,N'-hexamethylenebis(methacrylamide), N-hydroxyethyl acrylamide, N-(hydroxymethyl)acrylamide, N-(2-hydroxypropyl)-2-methyl-prop-2-enamide, N-(isobutoxymethyl)-acrylamide, N-isopropylacrylamide, N-isopropylmethacrylamide, methacrylamide, N-(3-methoxypropyl)acrylamide, N-phenylacrylamide, 2-acrylamido-2-methyl-1-propanesulfonic acid, 3-(acrylamido) phenylboronic acid, Nacryloylamidoethoxyethanol, N-(triphenylmethyl)-methacrylamide, Ntris(hydroxymethyl)methyl]-acrylamide and salts thereof.

In further embodiments, acrylate monomers may be selected from the group consisting of 4-acetoxyphenethyl acrylate, 4-acryloylmorpholine, butyl acrylate, 2-(4-benzoyl-3-hydroxyphenoxy)ethyl acrylate, benzyl 2-propyl acrylate, tert-butyl acrylate, 2-[[(butylamino)carbonyl]oxy] ethyl acrylate, 4-tert-butylcyclohexyl acrylate, 2-carboxyethyl acrylate, 2-(diethylamino)ethyl acrylate, di(ethylene glycol) ethyl ether acrylate, di(ethylene glycol) 2-ethylhexyl ether acrylate, 2-(dimethylamino)ethyl acrylate, 3-([[D]]dimethylamino)propyl acrylate, dipentaerythritol penta-/hexaacrylate, ethyl acrylate, ethyl cis-(β-cyano)acrylate, ethylene glycol dicyclopentenyl ether acrylate, ethylene glycol methyl ether acrylate, ethylene glycol phenyl ether acrylate, ethyl 2-ethylacrylate, 2-ethylhexyl acrylate, ethyl 2-propylacrylate, ethyl 2-(trimethylsilylmethyl)acrylate, hexyl acrylate, 4-hydroxybutyl acrylate, 2-hydroxyethyl acrylate, 2-hydroxy-3-phenoxypropyl acrylate, hydroxypropyl acrylate, isobutyl acrylate, isodecyl acrylate, isooctyl acrylate, lauryl acrylate, methyl 2-acetamidoacrylate, methyl acrylate, methyl 3-hydroxy-2-methylenebutyrate, octadecyl acrylate, poly(ethylene glycol) acrylate, poly(ethylene glycol) diacrylate, poly(ethylene glycol) methyl ether acrylate, poly(propylene glycol) acrylate, 3-sulfopropyl acrylate, tetrahydrofurfuryl acrylate, 2-tetrahydropyranyl acrylate, 3-(trimethoxysilyl)propyl acrylate, 3,5,5-trimethylhexyl acrylate, 10-undecenyl acrylate, urethane acrylate methacrylate and salts thereof.

In some embodiments, methacrylate monomers for use in the binders disclosed herein may be selected from the group consisting of allyl methacrylate, aminoethyl methacrylate, 2-[3-(2H-benzotriazol-2-yl)-4-hydroxyphenyl]ethyl methacrylate, benzyl methacrylate, bis(2-methacryloyl)oxyethyl disulfide, bis(2-methacryloyl)oxyethyl disulfide, 2-(2-bromoisobutyryloxy)ethyl methacrylate, 2-(tert-butylamino) ethyl methacrylate, butyl methacrylate, tert-butyl methacrylate, carbazole-9-ethylmethacrylate, 3-chloro-2-hydroxypropyl methacrylate, cyclohexyl methacrylate, 2-(diethylamino)ethyl methacrylate, diethylene glycol butyl ether methacrylate, di(ethylene glycol) methyl ether methacrylate, 2-(diisopropylamino)ethyl methacrylate, 2-(dimethylamino)ethyl methacrylate, 2-ethoxyethyl methacrylate, ethylene glycol dicyclopentenyl ether methacrylate, ethylene glycol methacrylate phosphate, ethylene glycol methyl ether methacrylate, ethylene glycol phenyl ether methacrylate, ethylhexyl methacrylate, ethyl methacrylate, furfuryl methacrylate, glycidyl methacrylate, glycosyloxyethyl methacrylate, hexyl methacrylate, hydroxybutyl methacrylate, hydroxyethyl methacrylate, hydroxypropyl methacrylate, hydroxypropyl methacrylates, 2-hydroxypropyl 2-(methacryloyloxy)ethyl phthalate, 2-hydroxy-3-{3-[2,4,6, 8-tetramethyl-4,6,8-tris(propyl glycidyl ether)-2-cyclotetrasiloxanyl]propoxy}propyl methacrylate, isobutyl methacrylate, 2-isocyanatoethyl methacrylate, isodecyl methacrylate, lauryl methacrylate, methacrylic acid N-hydroxysuccinimide ester, methyl methacrylate, 2-(methylthio)ethyl methacrylate, mono-2-(methacryloyloxy)ethyl maleate, mono-2-(methacryloyloxy)ethyl succinate, 2-N-morpholinoethyl methacrylate, naphthyl methacrylate, 2-(2-oxo-1-imidazolidinyl)ethyl methacrylate, pentabromophenyl methacrylate, 1,4-phenylene dimethacrylate, phenyl methacrylate, phosphoric acid 2-hydroxyethyl methacrylate ester, poly(ethylene glycol) behenyl ether methacrylate, poly(propylene glycol) methacrylate, propyl methacrylate, 1-pyrenemethyl methacrylate, stearyl methacrylate, 3-sulfopropyl methacrylate, 3-(trimethoxysilyl)propyl methacrylate, 3,3,5-trimethylcyclohexyl methacrylate, (trimethylsilyl)methacrylate, urethane acrylate methacrylate, urethane epoxy methacrylate, vinyl methacrylate and salts thereof.

In some embodiments, polyfunctional acrylics may be used as crosslinkers, including those selected from the group consisting of 3-(acryloyloxy)-2-hydroxypropyl methacrylate, bis[2-(methacryloyloxy)ethyl] phosphate, bisphenol A propoxylate diacrylate, 1,3- and 1,4-butanediol diacrylate, 1,3- and 1,4-butanediol dimethacrylate, N,N'-(1,2-dihydroxyethylene)bisacrylamide, di(ethylene glycol)dimethacrylate, di(trimethylolpropane) tetraacrylate, diurethane dimethacrylate, N,N-ethylenebis(acrylamide), ethylene glycol dimethacrylate, glycerol 1,3-diglycerolate diacrylate, glycerol dimethacrylate, glycerol propoxylate triacrylate, 1,6-hexanediol diacrylate, 1,6-hexanediol dimethacrylate, 1,6-hexanediol ethoxylate diacrylate, 1,6-hexanediylbis[oxy (2-hydroxy-3,1-propanediyl)] bisacrylate, hydroxypivalyl hydroxypivalate bis[6-(acryloyloxy)hexanoate], neopentyl glycol diacrylate, neopentyl glycol propoxylate diacrylate, pentaerythritol diacrylate monostearate, pentaerythritol tetraacrylate, pentaerythritol triacrylate, poly(propylene glycol) diacrylate, poly(propylene glycol) dimethacrylate, 1,3, 5-triacryloylhexahydro-1,3,5-triazine, tricycledecanedimethanol diacrylate, trimethylolpropane ethoxylate methyl ether diacrylate, trimethylolpropane ethoxylate triacrylate, trimethylolpropane ethoxylate triacrylate, trimethylolpropane ethoxylate triacrylate, trimethylolpropane propoxylate triacrylate, trimethylolpropane triacrylate, trimethylolpropane trimethacrylate, tri(propylene glycol) diacrylate and tris[2-(acryloyloxy)ethyl] isocyanurate.

In some embodiments, the dry weight ratio of crosslinker capable of undergoing free radical polymerization to free radical initiator for initiation of further crosslinking reactions between saccharide residues and the crosslinker ranges between 2:0.5 and 20:1, including between 5:1 and 10:1. In certain embodiments, the dry weight concentration of crosslinker in the binder composition may advantageously vary from 2-30% by weight (wt. %), such as from 5-20 wt. % and from 5-15 wt. %.

In further embodiments, a free radical initiator for use in the disclosed technology may comprise inorganic peroxides selected from the group consisting of hydrogen peroxide, peroxodisulfates such as the mono- or di-alkali metal salts thereof, ammonium salts of peroxodisulfuric such as their mono- and di-sodium salts and ammonium salts, ammonium, sodium or potassium persulfates, and mixtures thereof.

In still further embodiments, a free radical initiator for use in accordance with the instant disclosure may comprise organic peroxides, alkyl hydroperoxides, tert-butyl hydroperoxide, cumyl hydroperoxide, cumene hydroperoxide, dialkyl and diaryl peroxides such as di-tert-butyl and dicumyl peroxide, di-tert-amyl peroxide, benzyl peroxide, butanone peroxide, lauroyl peroxide, 2,5-bis(tert-butylperoxy)-2,5-dimethylhexane, 1,1-bis(tert-butylperoxy)-3,3,5-trimethyl-cyclohexane, 1,1-bis(tertamylperoxy)cyclohexane, tert-butyl peroxybenzene and tert-butylperoxy 2-ethylhexyl carbonate.

In additional embodiments, azo compounds may be used as free radical initiators in the disclosed binder compositions and may be selected from the group consisting of azobis (isobutyronitrile) (AIBN), 2,2'-azobis(2-methylpropionitrile), 4,4'-azobis(4-cyanovaleric acid), 1,1'-azobis(cyclohexanecarbonitrile), 2,2-azobis(2,4-dimethylvaleronitrile) and 2,2'-azobis(amidinopropyl) dihydrochloride (AIBA).

In certain embodiments, oxidizing agents for use as oxidation-reduction (redox) initiators may be selected from the inorganic peroxides and functionalized peroxides disclosed herein. In some embodiments, reducing agents for use with the disclosed technology may be selected from the group consisting of sulfur compounds with a low oxidation state, such as alkali metal sulfites, potassium and/or sodium sulfite, alkali metal sulfites such as potassium and/or sodium hydrogen sulfite, alkali metal metabisulfites such as potassium and/or sodium metabisulfite, potassium and/or sodium alkali metal salts such as potassium and/or sodium salts of aliphatic sulfinic compounds, alkali metal hydrogen sulfides such as potassium and/or sodium hydrogen sulfide, salts of polyvalent metals such as iron(II) sulfate, iron(II) ammonium sulfate, iron (II) phosphate, and cerium salts such as ceric ammonium nitrate.

In some embodiments, the disclosed binder compositions advantageously exhibit a reduced tendency to form dark brown-colored binder resins, e.g. the disclosed binders may comprise light brown to nearly white colors similar to those observed in champagne, tapioca, vanilla custard, papyrus, nude and wheat.

In further embodiments, the aqueous binder compositions disclosed herein comprise one or more polysaccharides crosslinked by an azetidinium crosslinker comprising at least two azetidinium groups, and further comprises a polycarboxylic acid and a free radical initiator for the initiation of additional crosslinking reactions between the polysaccharide residues and the polycarboxylic acid. The disclosed aqueous binder compositions may, in certain embodiments, beneficially exhibit improved bond strength upon curing.

In some embodiments, the binder compositions disclosed herein, as well as binders produced therefrom, are essentially formaldehyde-free, i.e. the binder compositions comprise less than about 1 ppm formaldehyde based on the weight of the composition, and advantageously do not emit detectable formaldehyde levels.

In alternative embodiments, the disclosed aqueous binder compositions may comprise additive compounds selected from the group consisting of coupling agents, dyes, antifungal agents, antibacterial agents, hydrophobic compounds and other additives known in the art for such binder applications. In embodiments where silicon-containing coupling agents are incorporated in the disclosed binders, such agents are generally present at a concentration from about 0.1% to about 1% by weight based on the weight of the solids in the binder composition. These additives may beneficially enhance the adhesive, mechanical and additional properties of the binder while advantageously complying with stringent environmental and health related requirements.

Without wishing to be bound by any general or particular theory, it is believed that the curing of the disclosed binder compositions generates highly-crosslinked, high molecular weight polymers that beneficially enhance the relevant properties of the binder.

As used herein, the term "binder composition" includes any composition capable of binding loosely assembled matter, either as such or upon curing. In some embodiments, the binder composition comprises an aqueous curable and/or uncured composition comprising the starting materials for forming a thermosettable binder resin, including any reaction product(s) resulting from the reaction or partial reaction of the starting materials and/or additives.

As used herein, the term "aqueous" relates to a solution and/or dispersion comprising water as a solvent including compositions and mixtures comprising water and one or more additional solvents. An "aqueous binder composition" in accordance with the instant disclosure may comprise a solution or partial solution of one or more binder components or a dispersion, such as an emulsion or suspension.

In some embodiments, the solid content of an aqueous binder composition disclosed herein may range from 5-95 wt. %, including from 8-90 wt. % and from 10-85 wt. %, based on the weight of the total aqueous binder composition. In embodiments where a binder as disclosed herein is utilized for the production of mineral wool insulation, the solid content concentration of the aqueous binder composition may be 5-25 wt. %, such as from 8-20 wt. %, from 10-20 wt. % and 12-18 wt. %, based on the total weight of the aqueous binder composition. When used as a binder in wood boards, such as plywood, particle boards and fiber boards, the solid content of an aqueous binder composition disclosed herein may range from 50-95 wt. %, including 50-90 wt. %, 55-85 wt. % and 60-80 wt. % of the total weight of the aqueous binder composition.

In some embodiments, the aqueous binder compositions disclosed herein may comprise nanoparticles derived from inorganic materials selected from the group consisting of metal oxides, MgO, CaO, $Al_2O_3$ and $CaCO_4$. In additional embodiments, nanoclays may be incorporated in the disclosed aqueous binder formulations, which may be selected from the group consisting of bentonite, kaolinite, hectorite, halloysite, organically-modified nanoclays and mixtures thereof. In further embodiments, these materials may be present in the aqueous binder compositions of the instant disclosure at a concentration of 0.1-10 wt. %, such as 0.1-5 wt. % of the solid content of the total binder composition.

In additional embodiments, the chemical components of the disclosed binder compositions may be transported separately and combined prior to processing, for instance in a manufacturing plant. In alternative embodiments, a pre-reacted crosslinked starch may be transported separately from and later combined/formulated with a crosslinker and/or free radical initiator for producing an aqueous binder composition.

In some embodiments, the disclosed binders may be used to bond a collection of non- or loosely assembled matter. The collection of matter may comprise any fibrous collection of matter selected from the group consisting of mineral fibers, slag wool fibers, stone wool fibers, glass fibers, aramid fibers, ceramic fibers, metal fibers, carbon fibers, polyimide fibers, polyester fibers, rayon fibers and cellulosic fibers. In additional embodiments, materials selected from the group consisting of coal, cellulosic fibers, wood shavings, saw dust, wood pulp, ground wood, wood chips, wood strands, wood layers, other natural fibers, such as jute, flax, hemp, straw, wood veneers, facings, wood particles, mineral fibers and additional woven and non-woven materials may be bound by the aqueous binder compositions of the present technology.

In further embodiments, the binder compositions disclosed herein may be used to produce and manufacture insulation products and articles, including but not limited to insulation products and articles comprising mineral fibers. For instance, the fibers may be bonded together by an aqueous binder composition disclosed herein to form a fiber mat which may be further processed into an insulation product or article. In still further embodiments, the fibers comprise a concentration of 70-99% by weight (wt. %) with respect to the total weight of the insulation product or article.

In certain embodiments, the disclosed aqueous binder compositions may be used to bond materials selected from the group consisting of cellulosic particles, cellulosic fibers, wood shavings, wood layers, wood sheets, wood pulp and other materials commonly used to manufacture composite wood boards, including fiber boards, particle boards, oriented strand boards and plywood. In related embodiments, a wood board comprising an aqueous binder composition as disclosed herein may comprise 1) a thickness of 6-30 mm; 2) a modulus of elasticity, also known as Young's modulus, of at least about 1000 N/mm$^2$; 3) a bending strength of at least about 5 N/mm$^2$; and/or 4) an internal bond strength of at least 0.10 N/mm$^2$. In additional embodiments, the concentration of aqueous binder composition in the wood board product or article may be about 5-30 wt. % of the total weight of the wood board product or article, including about 9-20 wt. %.

In some embodiments, an aqueous binder composition as disclosed herein may be effectively applied to a fiber, particulate and sheet material, for instance by spraying. Additional techniques for applying the disclosed binder compositions include roller/rolling applications, and mixing and/or tumbling a collection of matter with the binder composition. While not limiting or binding the present technology to any particular theory, it is believed that the binder composition forms a gel following the evaporation of endogenous water that bonds the particulate material together when arranged into a desirable assembly as described herein. The reactive binder components, upon curing, form an essentially water insoluble macromolecular binder resin. In certain embodiments, the curing of an aqueous binder composition disclosed herein may benefi-cially exhibit increased adhesion, durability and water resistance as compared to the same binder prior to or in the absence of curing. In additional embodiments, the binders of the present disclosure may be cured at temperatures between ambient temperatures, for instance from about 10-25° C., up to 280° C.

In some embodiments, the present technology provides for processes for the preparation of an article or product comprising fibrous materials, particulate materials and sheet materials by the application and optional curing of an aqueous binder composition disclosed herein. In additional embodiments, an article or product may be further processed following its initial production, which may be selected from insulation products and wood boards as disclosed herein. In further embodiments, a process for the manufacturing of an article or product comprising an assembly of fibers, cellulosic particles, and sheets may comprise (i) an effective concentration or amount of (a) a monosaccharide and/or polysaccharide, (ii) an effective concentration or amount of (b) an azetidinium crosslinker, (iii) the successive or simultaneous application of (a) and (b), optionally as an aqueous composition comprising (a) and (b), and optionally (a) crosslinked by (b), onto a material selected from the group consisting of fibrous materials, cellulosic particulate materials and sheet materials to produce a resinated material, and (v) curing the resinated material and allowing for the evaporation of excess water.

In related embodiments, a process for the manufacturing of an assembly of fibrous or cellulosic particle or sheet material may comprise the successive or concomitant application onto fibrous or cellulosic particulate or sheet material of an aqueous binder composition as disclosed herein comprising (a) crosslinked with (b), and optionally (c) an additional crosslinker and/or (d) a free radical initiator, optionally in the form of a single aqueous composition, to produce a resinated material, optionally allowing for additional crosslinking to occur, subjecting the resulting aqueous composition to curing conditions and allowing for the evaporation of excess water.

In further related embodiments, one or more polymerization and/or copolymerization reactions of (b) with (a) may be performed at a temperature ranging from ambient temperature, for instance 10-25° C., up to 200° C., such as from 40-95° C. Additional crosslinking with (c), optionally in the presence of (d), may also be performed within the same temperature ranges.

In certain embodiments, curing may be performed at a temperature of 90-200° C., including 140-190° C. and 160-180° C. In some embodiments related to the manufacture of wood boards comprising the aqueous binders disclosed herein, curing is performed while the material is subjected to pressing.

BRIEF DESCRIPTION OF THE DRAWINGS

Certain embodiments of the disclosed technology are disclosed in the drawings as filed, wherein.

EXAMPLES

For the production of the disclosed binder compositions, the starch polymers Stadex® 79, 125 and 201, and ETH-YLEX® 2005, 2040 and 2095, were purchased from Tate & Lyle PLC (London, UK). The azetidinium crosslinker CA1025 was purchased from SOLENIS™ (Wilmington, Del., USA). Finally, hydroxyethyl methacrylate (HEMA), diethyleneglycol dimethacrylate (DEGDMA), and 1,1'-azo-bis (cyclohexanecarbonitrile) (ABCN) were purchased from MilliporeSigma (a division of Merck KGaA, Darmstadt, Del.).

Preparation of Binder Solution Compositions

A desired amount of saccharide was dissolved in water and stirred constantly for a sufficient period of time (for instance, 45 minutes in the case of starch) at room temperature. As necessary, the temperature was raised up to 80° C. in order to completely dissolve the saccharide in water. For crosslinking reaction, the required amount of azetidinium crosslinker was added to the saccharide solution. The saccharide was allowed to crosslink by stirring at an elevated temperature and/or by adding a small amount of free radical initiator. The resulting mixture was impregnated on a glass veil and subjected to curing. Samples were prepared from the cured glass veil and subjected to different tests as described below.

Additionally, a portion of the saccharide mixture comprising the azetidinium crosslinker was combined with HEMA or DEGDMA and free radical initiator ABCN. The resulting aqueous compositions were stirred continuously at a pre-set temperature to obtain a complex crosslinked polymer network.

In accordance with certain embodiments, the crosslinking of starch with an azetidinium crosslinker can take place between various molecules such as amylose to amylose, amylose to amylopectin, or amylopectin to amylopectin. When these linkages are formed, further crosslinking and/or copolymerization reactions can be carried out with polycarboxylic crosslinkers using a free radical initiator as described herein, with free radical initiation being promoted, in some embodiments, by an increase of temperature and/or the introduction of radiation sources such as IR, RF or UV radiation. The resulting aqueous composition was applied to a glass veil and cured. Samples were prepared from the cured veil and subjected to different tests as described below.

Kinetic Evaluation of Curing

Glass microfiber (Whatman™) GF/A filters were impregnated with binder solution as described above prior to curing at various time points at a set temperature. Samples were kept on the top shelf in an oven to avoid the potentially high moisture content inside the oven during curing. For each binder solution, samples were cured for a time period of 3 minutes to 20 minutes. After curing, each cured sample was cut into an appropriate size of defined length (150 mm) and width (20 mm), and mechanical testing was performed for stiffness and bond strength analysis on the cured samples. The results of the kinetic study or cure rate study are presented in FIGS. 1 and 2.

Bond Strength Analysis Using the Veil Method

Commercial PF (phenol formaldehyde) impregnated (A4 size) glass fiber veils were placed into a benchtop muffle furnace oven for 30 minutes at 600° C. in order to burnout the PF binder, and were then allowed to cool for 30 minutes. The resulting veil samples were then weighed.

Next, approximately 400 g binder solution samples were poured into dip trays, and the resulting veil samples were fully immersed into the binder solution samples. The impregnated veils were then cured at defined temperatures for defined periods of time. The resulting binder content was then measured and bond strength determined as described below.

The bond strength of the cured binder impregnated veils was determined by a mechanical testing instrument (M350-10CT). For each test, a cured binder-impregnated A4-type veil was cut into eight (8) equal strips. Each strip was tested separately using a 50 kg load cell (DBBMTCL-50 kg) at an automated test speed of 10 mm/min. The mechanical testing instrument was controlled using winTest™ Analysis software (Testometric Company Ltd., Rochdale, UK). The glass veil tensile plates were attached to the mechanical testing instrument, with 100 mm gaps between plates. Samples were placed vertically in the grippers, with the force measurement tarred to zero. Various parameters such as maximum load at peak, stress at peak and modulus at peak were evaluated by the software, and data presented as an average of the eight (8) samples, with the standard deviation also determined. The average maximum load at peak or stress at peak is defined as the bond strength of the sample.

Evaluation of Weathering Stability

An electronically controlled autoclave system (a steam pressure vessel) was then used to sterilize the cured binder veils samples for strength testing. Cured binder impregnated veils were placed in an autoclave (J8341, Vessel: PV02626 with associated safety valve, door interlock and integrated pipework) system. Samples were treated at 90% humidity and at a temperature ranging from 40-110° C. (full cycle), at a pressure of up to 2.62 bar, for three (3) hours. The samples were dried completely in order to ensure no moisture remained on the veils. The autoclave treated samples were then tested for bond strength using the M350-10CT testometric machine (M350-10CT), and the results were compared with those of untreated samples.

Dynamic Mechanical Analysis (DMA)

Binder impregnated Whatman™ Grade 3 Filter Papers (MilliporeSigma, a division of Merck KGaA, Darmstadt, Del.; dimensions of 35 mm×10 mm×0.36 mm) was prepared with 100 grams of pre-mixed aqueous binder solution comprising 20% solids. Binder impregnated filter strips were kept at ambient temperature (approximately 22° C.) for about one hour for initial drying. Each strip was then carefully mounted on a DMA sample holder. The DMA tests were performed on a dual cantilever mode using two frequencies (1 Hz and 10 Hz) at 1° C./min. The modulus was measured as a function of scanning temperature, and the results are presented in FIGS. 3-4.

Example 1

The determination of binder solid weight loss upon curing at 140° C. for 2 hours is presented in Table 1. Aqueous binder compositions (solutions) as prepared above were brought to a solid content of 22.5%. About 12 g of binder solution was placed into an aluminum petri dish, which was kept in an oven at 140° C. for 2 hours. The theoretical and experimental solid concentration was measured, and the solid loss was calculated. The binder compositions comprise starch as a polysaccharide, azetidinium compound as a crosslinker, acrylates (HEMA: 2-hydroxyethyl methacrylate, or DEGDMA: di(ethylene glycol)dimethacrylate) as an additional crosslinker, and ABCN (1,1'-azobis(cyclohexanecarbonitrile) as a radical initiator.

TABLE 1

| Binder Materials | Composition | Solid Loss (%) |
| --- | --- | --- |
| Stadex ® 79/CA1025 | 90:10 | 2.4 |
| Stadex ® 79/CA1025/HEMA/ABCN | 80:10:10:1 | 0.12 |
| Stadex ® 79/CA1025 | 85:15 | 1.7 |
| Stadex ® 79/CA1025/HEMA/ABCN | 75:15:10:1 | 0.003 |
| Stadex ®79/CA1025 | 80:20 | 3.49 |
| Stadex ®79/CA1025/HEMA/ABCN | 70:20:10:1 | 3.49 |
| Stadex ®79/CA1025/DEGDMA/ABCN | 70:20:10:1 | 10.04 |

Example 2

Figure 1:
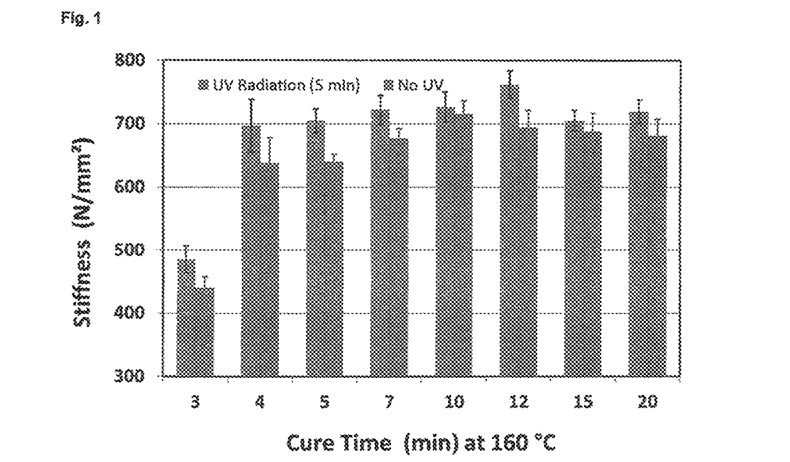
FIG. 1 shows a kinetic curing profile at 160° C. for binder formulations comprising 70% Stadex® 79+20% CA1025+ 10% DEGDMA+1% azobis(cyclohexanecarbonitrile) (ABCN).

The kinetic evaluation of curing was determined at 160° C. for binder formulations of Stadex® 79/CA1025/DEGDMA/ABCN, at a ratio of 70:20:10:1, as shown in FIG. 1, with a standard deviation of five replicates. The binder composition was prepared and the stiffness of corresponding sample was measured according to the procedure described in the previous section.

Example 3

Figure 2:
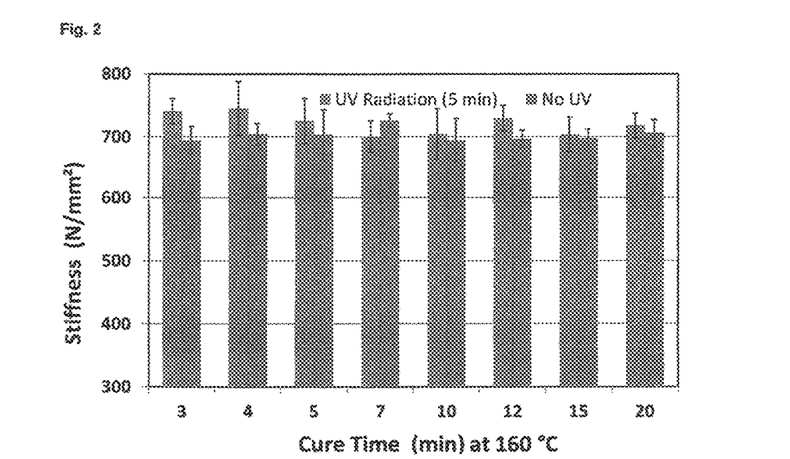
FIG. 2 shows a kinetic curing profile at 160° C. for binder formulations comprising 70% Stadex® 79+20% CA1025+ 10% HEMA+1% azobis(cyclohexanecarbonitrile) (ABCN).
Figure 3:
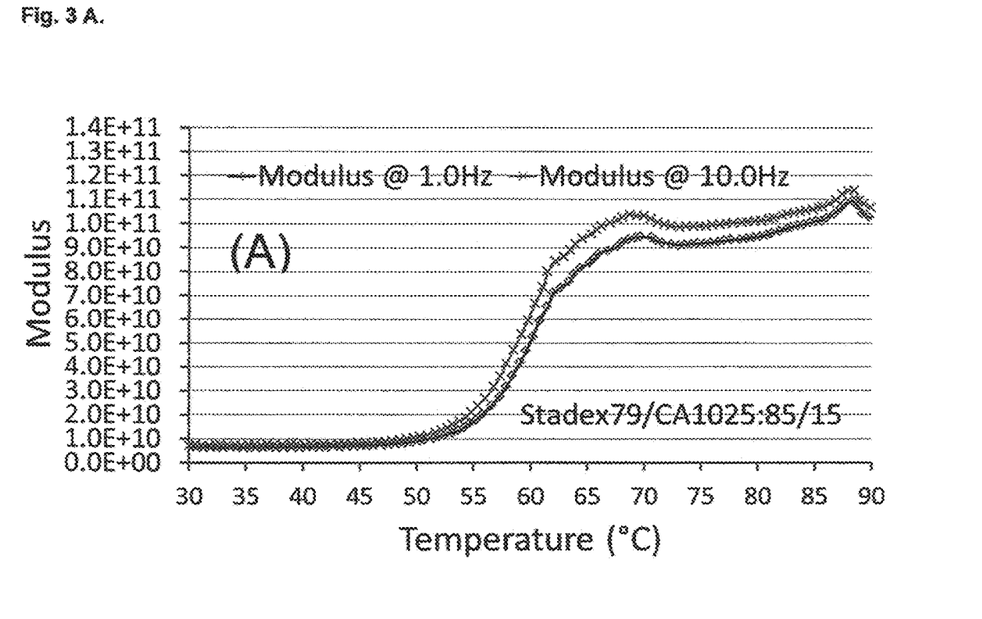
FIGS. 3A and 3B show the modulus as a function of temperature measured at two different frequencies (1 Hz and 10 Hz), as determined by dynamic mechanical analysis (DMA), of two different binder compositions.
Figure 4:
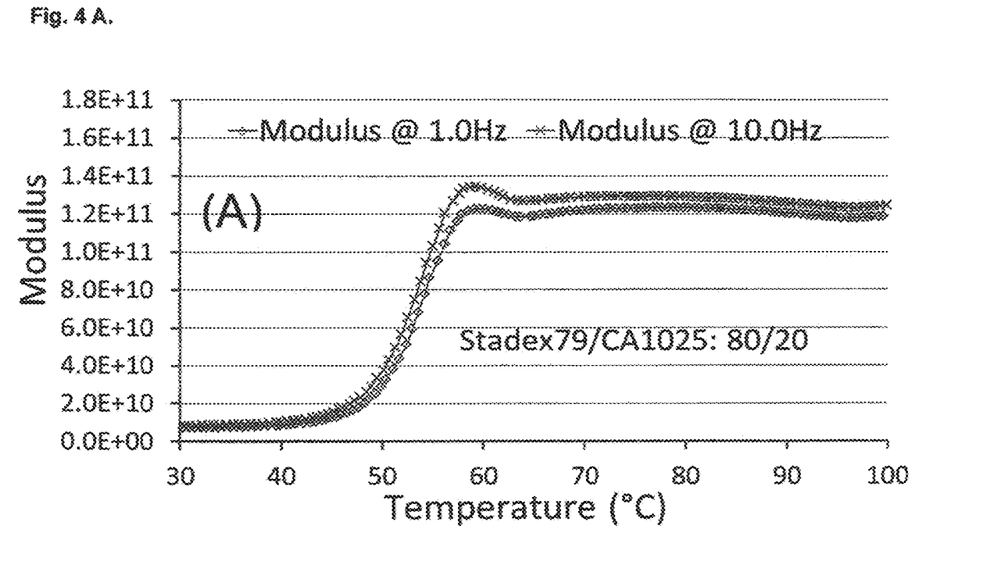
FIGS. 4A and 4B show the modulus as a function of temperature measured at two different frequencies (1 Hz and 10 Hz), as determined by dynamic mechanical analysis (DMA), of two different binder compositions.

The kinetic evaluation of curing was determined at 160° C. for binder formulations of Stadex® 79/CA1025/HEMA/ABCN, at a ratio of 70:20:10:1, as presented in FIG. 2, with a standard deviation of five replicates. The binder composition was prepared according to the description given in the previous section.

In Examples 2 and 3, some samples were exposed to an additional step, i.e. UV radiation for a time period of 5 minutes, in order to enhance curing, with the results compared to a corresponding un-exposed sample. The binder compositions show good curing time in the range of 3-5 minutes. Additionally, curing may be enhanced by UV radiation treatment prior to temperature curing.

Example 4

The bond strength of various binder formulations comprising a monosaccharide (dextrose monohydrate (DMH)), disaccharide (maltose monohydrate (maltose MH)) and polysaccharide (maltodextrin, from 3 to 19 saccharide units), and their combination with starch (Stadex® 79), CA1025, HEMA, and optionally ABCN, is presented. The mechanical tests were performed on cured (180° C. for 15 minutes) veil samples at dry conditions, for both unweathered and weather treated veils, and the results are presented with standard deviation based on eight replicates, as shown in Table 2.

TABLE 2

| | Unweathered Veil Samples | | Weathered Veil Samples | |
| --- | --- | --- | --- | --- |
| Formulations | Average Bond Strength (N) | Standard Deviation (+/−) | Average Bond Strength (N) | Standard Deviation (+/−) |
| DMH/CA1025: 80:20 | 65.64 | 13.61 | 68.61 | 11.13 |
| DMH/CA1025/HEMA/ABCN: 70:20:10:1 | 70.17 | 17.09 | 70.45 | 7.23 |
| Maltose MH/CA1025: 80:20 | 89.17 | 17.95 | 75.19 | 16.68 |
| Maltose MH/CA1025/HEMA/ABCN: 70:20:10:1 | 82.63 | 11.52 | 70.56 | 9.71 |
| Maltodextrin/CA1025: 80:20 | 104.31 | 7.62 | 104.67 | 8.39 |
| Maltodextrin/CA1025/HEMA/ABCN: 70:20:10:1 | 100.40 | 9.70 | 100.75 | 7.45 |
| Stadex ® 79/DMH/CA1025/HEMA/ABCN: 50:20:20:10:1 | 109.13 | 14.10 | 102.04 | 14.19 |
| Stadex ® 79/Maltose MH/CA1025/HEMA/ABCN: 50:20:20:10:1 | 103.49 | 10.06 | 97.57 | 5.40 |
| Stadex ® 79/Maltodextrin/CA1025/HEMA/ABCN: 50:20:20:10:1 | 112.16 | 5.94 | 99.48 | 8.53 |

Example 5

Bond strength analysis of various binder formulations comprising starch, azetidinium crosslinker (CA1025), with and without acrylate (HEMA) and radical initiator ABCN or $Ce^{4+}$) in the compositions, was performed. The bond strength is defined as the maximum load at which the veil impregnated cured samples breaks down. Results are shown for unweathered and weather treated veil samples. These impregnated veils were cured at a desired temperature (e.g. 180° C.) for 15 minutes and mechanical tests were performed at dry conditions. The results are presented with standard deviation based on sixteen replicates, as shown in Table 3. The invention compositions show high bond strength for all samples. It is noted that the bond strength either remained in the same range within the statistical deviation or improved after weather treatment.

TABLE 3

| Formulations | Unweathered Veils Samples | | Weather Treated Veils Samples | |
|---|---|---|---|---|
| | Average Bond Strength (N) | Standard Deviation (+/−) | Average Bond Strength (N) | Standard Deviation (+/−) |
| Stadex ® 79/CA1025: 92.5:7.5 | 81.27 | 5.70 | 91.82 | 5.28 |
| Stadex ® 79/CA1025: 90:10 | 84.81 | 7.84 | 95.90 | 9.52 |
| Stadex ® 79/CA1025: 87.5:12.5 | 95.09 | 7.46 | — | — |
| Stadex ® 79/CA1025/Ce$^{4+}$: 87.5:12.5:1 | 94.01 | 9.24 | — | — |
| Stadex ® 79/CA1025: 85:15 | 102.79 | 14.36 | — | — |
| Stadex ® 79/CA1025/Ce$^{4+}$: 85:15:1 | 99.84 | 13.08 | — | — |
| Stadex ® 79/CA1025: 80:20 | 92.42 | 9.65 | 95.17 | 7.83 |
| Stadex ® 79/CA1025/HEMA: 70:20:10 | 94.67 | 9.55 | 98.32 | 13.29 |
| Stadex ® 79/CA1025/HEMA/ABCN: 82.5:7.5:10:1 | 84.39 | 6.59 | 92.06 | 8.53 |
| Stadex ® 79/CA1025/HEMA/ABCN: 80:10:10:1 | 94.58 | 9.39 | 98.97 | 9.99 |
| Stadex ® 79/CA1025/HEMA/ABCN: 70:20:10:1 | 100.08 | 14.36 | 90.62 | 5.24 |

Example 6

Modulus analysis by DMA was carried out for binder formulations comprising Stadex® 79/CA1025, comprising a ratio of 85:15, and Stadex® 79/CA1025/HEMA/ABCN comprising a ratio of 75:15:10:1, as presented in FIG. 3A and FIG. 3B, respectively. A significantly higher modulus was observed for the second formulation (FIG. 3B) as compared to the first formulation (FIG. 3A). Similar results were obtained for the composition comprising Stadex® 79/CA1025/HEMA/ABCN at a ratio of 70:20:10:1 (FIG. 4B) as compared to that of Stadex® 79/CA1025 at a ratio of 80:20 (FIG. 4A).

Example 7

The experiments of Example 5 were repeated with different starches, except that the curing temperature was 190° C. and the curing time was 10 minutes. The data obtained is shown in the tables below.

| Formulations | Veil bond strength | | | |
|---|---|---|---|---|
| | Av. Dry Strength (N) | Standard Deviation (+/−) | Av. Wet Strength (N) | Standard Deviation (+/−) |
| Stadex ® 125/CA1025: 80:20 | 98.46 | 8.12 | 77.72 | 12.44 |
| Stadex ® 125/CA1025: 75:25 | 95.90 | 10.47 | 85.33 | 6.44 |
| Stadex ® 125/CA1025: 70:30 | 94.37 | 7.88 | 85.82 | 6.21 |
| Stadex ® 125/CA1025: 65:25:10:1 | 100.38 | 5.96 | 83.69 | 6.45 |

-continued

| Formulations | Veil bond strength | | | |
|---|---|---|---|---|
| | Av. Dry Strength (N) | Standard Deviation (+/−) | Av. Wet Strength (N) | Standard Deviation (+/−) |
| Stadex ® 201/CA1025: 80:20 | 107.87 | 14.38 | 97.57 | 5.86 |
| Stadex ® 201/CA1025: 75:25 | 109.39 | 12.91 | 104.68 | 7.22 |
| Stadex ® 201/CA1025: 70:30 | 118.29 | 6.80 | 92.43 | 3.12 |
| Stadex ® 201/CA1025: 65:25:10:1 | 95.22 | 4.23 | 85.63 | 10.44 |
| Ethylex ® 2005 S/CA1025: 80:20 | 101.02 | 9.07 | 93.69 | 12.13 |
| Ethylex ® 2005 S/CA1025: 75:25 | 98.31 | 5.57 | 83.41 | 9.31 |
| Ethylex ® 2005S/CA1025: 70:30 | 97.85 | 5.26 | 91.19 | 6.94 |
| Ethylex ® 2005 S/CA1025: 65:25:10:1 | 90.27 | 7.70 | 91.12 | 8.97 |
| Ethylex ® 2040/CA1025: 80:20 | 112.27 | 9.55 | 89.37 | 8.97 |
| Ethylex ® 2040/CA1025: 75:25 | 112.06 | 8.42 | 76.99 | 8.52 |
| Ethylex ® 2040/CA1025: 70:30 | 102.21 | 8.65 | 85.13 | 8.34 |
| Ethylex ® 2040/CA1025: 65:25:10:1 | 93.58 | 7.11 | 80.64 | 5.49 |
| Ethylex ® 2095/CA1025: 80:20 | 91.62 | 3.99 | 87.38 | 8.07 |
| Ethylex ® 2095/CA1025: 75:25 | 101.25 | 14.15 | 79.37 | 5.64 |
| Ethylex ® 2095/CA1025: 70:30 | 109.23 | 7.76 | 82.57 | 9.70 |
| Ethylex ® 2095/CA1025: 65:25:10:1 | 109.62 | 5.81 | 7574 | 6.85 |

The above examples make use of commercially available starches as mentioned above. As shown below by way of viscosity measurements, Stadex® starches are low molecular weight starches, Ethylex® 2040 and 2095 starches are higher molecular weight starches.

TABLE 6

Viscosity measurement of modified starches.
Viscosity was measured using a Brookfield DV-II + Pro viscometer (AMETEK GB Ltd. Brookfield, Harlow, Essex, UK).
All measurements were performed at a constant temperature.

| Sample Name | Concentration (wt. %) | Temp. (° C.) | Viscosity Value (cps) | Comments |
|---|---|---|---|---|
| Stadex ® 79 | 20 | 35 | 6.67 | |
| Stadex ® 125 | 20 | 35 | 8.40 | |
| Stadex ® 201 | 20 | 35 | 4.17 | |
| Ethylex ® 2005 | 15 | 35 | 67 | |
| Ethylex ® 2005 | 20 | 35 | 275 | |
| Ethylex ® 2040 | 20 | 35 | xxx | The viscosity exceeded the highest detection limit of the machine. |
| Ethylex ® 2040 | 15 | 35 | 9900 | Highly viscous. |
| Ethylex ® 2095 | 20 | 35 | xxx | The viscosity exceeded the highest detection limit of the machine. |
| Ethylex ® 2095 | 15 | 35 | xxx | The viscosity exceeded the highest detection limit of the machine. |
| Ethylex ® 2095 | 10 | 70 | >101,000 | Highly viscous (below 70° C. machine did not detect). |

The invention claimed is:
1. A method of manufacturing a product which comprises a bonded assembly of fibrous material or cellulosic particu- late or sheet material, said method comprising (i) the provision of (a) a polysaccharide, (ii) the provision of (b) azetidinium cross-linker, (iii) the application of (a) and (b) as an aqueous composition consisting of (a), (b), optionally (a) cross-linked by (b), optionally (c) a cross-linker capable of undergoing free radical polymerization to further cross-link (a), optionally together with (d) a free radical initiator, optionally one or more coupling agents, dyes, antifungal agents, antibacterial agents, hydrophobes, metal oxide nanoparticles of MgO, CaO, $Al_2O_3$ and/or $CaCO_4$, nanoclays of montmorillonite, bentonite, kaolinite, hectorite, halloysite and/or organically modified nanoclays, and mixtures thereof, and water onto fibrous material or cellulosic particulate or sheet material to produce resinated material, and (iv) subjecting the resulting resinated material to curing conditions and allowing for evaporation of excess water.

2. The method of claim 1, wherein the cross-linking between (a) and (b) and optional further cross-linking with (c), in the presence of (d), is effected at a temperature ranging from ambient temperature to 200° C. during a required period of time to generate the desired cross-linked material.

3. The method of claim 1, wherein the cross-linking between (a) and (b) is effected by free radical initiation.

4. The method of claim 1, wherein the resinated material is subjected to UV radiation prior to being subjected to temperature curing as the curing conditions.

5. The method of claim 4, wherein the temperature curing is effected at a temperature ranging from 90-200° C.

6. The method of claim 1, wherein the (b) azetidinium cross-linker comprises a polyazetidinium comprising at least two monomeric units of the general formula wherein $R^1$ comprises a $C_1$-$C_{25}$ alkanediyl group optionally substituted with a hydroxyl group, carboxyl functional group or an amino group, $R^2$ comprises independently $R^1$ or —$R_3$—NH—C(O)—$R_4$—, wherein $R_3$ and $R_4$ comprise independently $C_1$-$C_{25}$ alkanediyl, $Y^1$ and $Y^3$ comprise independently H or a $C_1$-$C_5$ alkyl group optionally substituted with a hydroxyl group, an amino group or a carboxyl group, $Y^2$ comprises a hydroxyl group or independently $Y^1$, and $X^-$ comprises a halogen counter ion.

7. The method of claim 1, wherein the (a) polysaccharide comprises 2-5000 naturally sourced saccharide units and is selected from the group consisting of cellulose, chitin, crude starch, starch derivatives and mixtures thereof.

8. The method of claim 1, wherein the dry weight ratio of the (a) polysaccharide to the (b) azetidinium cross-linker in the product comprises a ratio of 98/2 to 70/30.

9. The method of claim 1, wherein the product is a mineral fiber insulation article that comprises a mineral wool mat.

10. The method of claim 1, wherein the product is a composite wood board article that comprises a wood fiber board, a wood particle board, or plywood.

11. The method of claim 1, wherein the dry weight ratio of the (a) polysaccharide to the (b) azetidinium cross-linker in the aqueous composition comprises a ratio of 95/5 to 75/25.

12. The method of claim 1, wherein the (c) cross-linker capable of undergoing free radical polymerization is selected from the group consisting of acrylamide, methacrylamide, acrylate, acrylonitrile, bisphenol acrylics, carbohydrate monomers, fluorinated acrylics, maleimide and mixtures thereof.

13. The method of claim 1, wherein the (c) cross-linker capable of undergoing free radical polymerization comprises 1-40% by weight of the total dry weight of the aqueous composition.

14. The method of claim 1, wherein the (d) free radical initiator is selected from the group consisting of inorganic peroxides, organic peroxides, reducing agents, azo compounds, redox initiators, photo-initiators, and mixtures thereof, and wherein the dry weight ratio of the (c) cross-linker capable of undergoing free radical polymerization to the (d) free radical initiator ranges between 2:0.5 and 20:1.

* * * * *